UNITED STATES PATENT OFFICE.

EUGEN NOWAK, OF BERLIN, GERMANY.

PROCESS OF PRODUCING SOLID IGNITING BODIES FOR AUTOMATIC GAS-IGNITERS.

SPECIFICATION forming part of Letters Patent No. 663,820, dated December 11, 1900.

Application filed May 19, 1900. Serial No. 17,294. (No specimens.)

*To all whom it may concern:*

Be it known that I, EUGEN NOWAK, engineer-chemist, a subject of the Emperor of Austria-Hungary, and a resident of Prinzenstrasse 89, in the city of Berlin, German Empire, have invented a certain new and useful Improved Process for the Production of Solid Igniting Bodies for Automatic Gas-Igniters, of which the following is an exact, full, and clear description.

This invention relates to a process for the production of solid igniting bodies or so-called "igniters," which are provided on gas-burners in combination with fine igniting-wires, touched by the issuing gas, made incandescent, and thereby automatically ignite the gas. The active element of these igniters is, as is known, spongy platinum or black platinum, which in consequence of the loose fine molecular distribution of the platinum possesses the property of condensing gases on the surface, and thereby igniting the same. If, however, platinum is continuously exposed to high temperatures, it sinters or slags together, loses its fine distribution, and no longer ignites. Attempts have therefore been made to obviate this disadvantage by using fire-resisting, porous, and indifferent materials—such as meerschaum, clay, &c.—as carriers for the platinum. Several processes are known for producing such igniters; but none of these igniters were lasting and reliable in their effect. With a previous process I have, however, obtained very good results. The fire-resisting raw material—such as meerschaum, clay, &c.—serving as carrier for the platinum was first treated with suitable solvents—such as acids, water, alcohol, and ether—in order to free the same from impure admixtures and make it more porous, whereupon the same was impregnated with platinum salts. By the same method I attain still better results if the carrier material treated with solvents is impregnated with other salts in addition to platinum salts, as follows from the following description.

I take a fire-resisting substance—such as clay, infusorial earth, meerschaum, &c.—digest the same in pure hydrochloric acid until a sample leaves no red residue behind, and then wash the material with hot water until it indicates no more acid. By this treatment the existing alkaline earths, ferruginous and argillaceous earth, and a part of the silicates dissolve. Now I digest the material with absolute alcohol and then again with sulfuric ether in order to remove any organic substances—such as fats, oils, and resins—which may be present, after which the material is placed in a platinum vessel, in which it is slowly heated to red heat. The material obtained in this manner is of quite a different chemical composition and molecular structure to that originally employed. It is distinguished by an extraordinarily high degree of porousness, is free from all organic admixtures, as also from the silicates decomposable by acids and from other soluble compounds, and therefore consists exclusively of completely-durable silicates.

The natural pure silicate skeleton is impregnated with a solution of platinum salts and thorium salts, to which cerium is added, until it is evaporated almost to dryness, thereupon completely dried *in vacuo*, and reduced in any known manner. The igniter is thereby finished without further handling.

Instead of platinum salts other metal salts can be used which yield a strong igniting-platinum, and instead of thorium salts other soluble and decomposable metal salts can be employed which after being reduced leave a fire-resisting residue behind, such as the rare earths. The single salts can without prejudicing the action be used for the impregnation simultaneously in mixture or also successively.

If, for instance, meerschaum is used as ground material for the production of such igniters, the same is reduced by the chemical treatment to one-half of its original weight, and thus one-half the mass with the same volume is obtained, thereby doubling the porousness. The pure silicate skeleton so obtained from the meerschaum mass impregnated with the salts of the rare earths, which after the reduction leave a spongy highly-porous oxid behind, forms for the platinum salts to be impregnated an extraordinary fire-resisting base of a high degree of suction or absorbability, which enables a considerably larger quantity of platinum salts to be stored up in the igniter than is possible with the natural meerschaum. The active surface of the platinum formed on this base is thereby considerably increased and also the molecular distribution of the same, and the igniter itself is, with regard to the atmospheric influences, unsusceptible, since it of course only consists of the indifferent durable silicates of the original meerschaum, the oxids of the rare earths, and the platinum metal. Thus according to this process a fire-resisting, rapid and continuously acting, weather-resisting igniting body is obtained, which complies with the highest requirements of an igniter.

Having now particularly described the said invention, what I claim, and wish to secure by Letters Patent, is—

The herein-described process for producing solid igniting bodies consisting in the following steps in the sequence named, to wit, digesting a suitable fire-resisting substance with pure hydrochloric acid until a test shows no red residue; washing with hot water until no acid is indicated; digesting with absolute alcohol; digesting with sulfuric acid; heating slowly to a red heat in a platinum vessel; impregnating with a solution of a salt of a metal of the platinum group and thorium salts to which cerium is added until almost evaporated to dryness; and finally completely drying in vacuum, substantially as described.

In witness whereof I have hereunto set my hand in presence of two witnesses.

EUGEN NOWAK.

Witnesses:
WOLDEMAR HAUPT,
HENRY HASPER.